Patented July 25, 1933

1,919,301

UNITED STATES PATENT OFFICE

HAROLD A. MORTON, OF AKRON, OHIO

AGE RESISTING VULCANIZED RUBBER AND ANTIOXIDANT AGENT

No Drawing. Application filed July 25, 1930. Serial No. 470,775.

My invention relates to rubber or rubber-like compounds and more particularly to those having incorporated therein or applied thereto, an anti-oxidant, whereby the aging quality of the compound is materially enhanced.

I have discovered that certain diamino substituted ethyl ethers, when incorporated in a rubber or rubber-like compound prior to the vulcanization thereof, or when applied to a vulcanized article, materially retard deterioration due to oxidation.

There are a great number of such diamino substituted ethyl ethers which function in this manner and in general they may be represented by the following general chemical constitution:

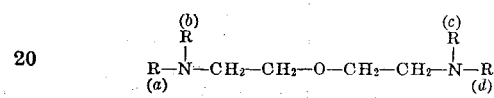

In the above representation of the constitutional formula, the chemical radicals attached to the nitrogen atoms are denoted by the symbols $R(a)$, $R(b)$, $R(c)$ and $R(d)$ and may be any of the following chemical groups or their equivalents:

H, $CH_3$, $CH_3CH_2$, $CH_3CH_2CH_2$, $(CH_3)_2CH$, $CH_3CH_2CH_2CH_2$, $(CH_3)_2CH$—$CH_2$, $CH_3CH_2CH_2CH_2CH_2$, $(CH_3)_2CH.CH_2CH_2$, $C_6H_5$, $C_6H_4CH_3$, $C_6H_3(CH_3)_2$, $C_6H_5CH_2$, $C_6H_4NH_2$, $C_6H_3(CH_3)NH_2$, $C_6H_4OH$, $C_{10}H_7$.

In this specification all of the materials referred to are nitrogen derivatives of ethyl ether. In general, they may be prepared by heating BB' dichlor ethyl ether with the appropriate amino compound although other methods of preparation may be employed.

One of the preferred members of this class of compounds is what may be termed BB' di(phenyl amino) ethyl ether. It probably has the following chemical constitution:

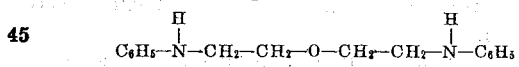

It may be prepared by heating four mols of aniline (372 pounds) with one mol of BB' dichlor ethyl ether (143 pounds) at a temperature of about 200° C. until reaction is complete. The reaction product is then extracted with a large quantity of hot water which eliminates the aniline hydrochloride, and leaves the semi-purified product as a residue. The yield in general is about 200 pounds and approximately one-half of the aniline employed, may be recovered from the aniline hydrochloride solution. The semi-purified product also contains N-phenyl morpholine and small quantities of other materials.

In order to carry out the invention, the semi-purified product may be utilized as such or it may be further purified.

While, in the above example, I have given the preferred method of manufacture, it is also possible to obtain products valuable as age resisters by using different ratios of BB' dichlor ethyl ether and aniline. In other words, it is possible to use only two or three mols of aniline per mol of BB' dichlor ethyl ether and it is also possible to use lower temperatures of reaction.

In this specification, where BB' diamino substituted ethyl ethers are referred to, it is intended to denote the reaction product of BB' dichlor ethyl ether with amines. The conventional chemical formula of BB' dichlor ethyl ether is:

$$Cl—CH_2—CH_2—O—CH_2—CH_2—Cl$$

After the removal of the amine hydrochloride, this semi-purified product may be used, in many cases without further purification. Or, if desired, the reaction product may be further purified. While it is considered that the above reaction takes place in the manner indicated, I do not wish to be bound by any of the chemical theories herein contained but desire to be protected by Letters Patent on the product obtained by heating BB' dichlor ethyl ether with amines and by the "product obtained" I mean the semi-purified product containing several ingredients or the purified product from which some of the by-products, such as morpholine derivatives have been removed.

Other typical anti-oxidants belonging to this class and prepared in the manner above indicated, are as follows:

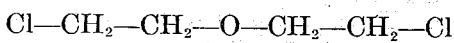

BB' di (ortho tolyl amino) ethyl ether
BB' di (para tolyl amino) ethyl ether
BB' di (xylyl amino) ethyl ether
BB' di (alpha naphthyl amino) ethyl ether
BB' di (beta naphthyl amino) ethyl ether
BB' di (ethyl phenyl amino) ethyl ether
B (phenyl amino) B' (ortho tolyl amino) ethyl ether
B (phenyl amino) B' (para tolyl amino) ethyl ether
B (phenyl amino) B' (alpha naphthyl amino) ethyl ether
BB' diamino ethyl ether
BB' di (methyl amino) ethyl ether
B (phenyl amino) B' amino ethyl ether
B (phenyl amino) B' (methyl amino) ethyl ether B (phenyl amino) B' (butyl amino) ethyl ether
B (phenyl amino) B' (ethyl amino) ethyl ether
BB' di (ethyl amino) ethyl ether
B (ortho tolyl amino) B' amino ethyl ether
B (ortho tolyl amino) B' (methyl amino) ethyl ether
B (ortho tolyl amino) B' (ethyl amino) ethyl ether
B (para tolyl amino) B' amino ethyl ether
B (para tolyl amino) B' (methyl amino) ethyl ether
B (para tolyl amino) B' (ethyl amino) ethyl ether
B (xylyl amino) B' (phenyl amino) ethyl ether
B (xylyl amino) B' (ortho tolyl amino) ethyl ether
B (xylyl amino) B' (ethyl phenyl amino) ethyl ether
B (xylyl amino) B' amino ethyl ether
B (xylyl amino) B' (methyl amino) ethyl ether
B (ortho tolyl amino) B' (alpha napbthyl amino) ethyl ether
B (ortho tolyl amino) B' (para tolyl amino) ethyl ether
B (phenyl amino) B' (ethyl phenyl amino) ethyl ether
B (para tolyl amino) B' (ethyl phenyl amino) ethyl ether There are many other materials of this class which function as anti-oxidants and the above list of materials serves only to indicate the scope of the invention.

While the materials cited above are the free bases it is also possible to use certain soaps and salts of these materials without materially affecting the anti-oxidant value.

In general, the most beneficial effect is obtained by using 0.75% to 1.5% of the anti-oxidant agent in the rubber compound (based on the rubber content) but lesser or greater quantities may be used, depending on purpose at hand. In general, and up to a certain point, the durability of the rubber goods is a function of the quantity of the material employed.

The materials listed above possess little or no accelerating properties and may be introduced directly into the rubber stock without materially disturbing the factory rate of cure. Those which have slight accelerating properties, either alone or in conjunction with the accelerator employed in the stock, may be added directly to the rubber stock and the accelerator content adjusted so that the rate of cure remains the same.

It has also been found possible to add the material after the rubber stock has been vulcanized and still obtain appreciable improvement in the aging qualities of the stock. This may be done by painting or dipping the rubber stock with a solution of the desired material and after allowing penetration to take place, to dry off the surplus solvent.

As examples of carrying out the invention the following are typical. In all of the examples "tensile" means tensile strength at break in pounds per square inch; "elongation" represents elongation at break in percent and cure is given in minutes at steam pressure per square inch.

Example 1

This example is designed to show the effect of BB' di (phenyl amino) ethyl ether in a rubber stock accelerated with diphenyl guanidine. The test was carried out on the crude product obtained by heating BB' di (chlor) ethyl ether (one mol) with aniline (four mols) and removing the aniline hydrochloride.

The composition of the rubber stock is as follows:

Rubber _____ 56.35
Stearic acid _____ 1.00
Carbon black _____ 25.00
Oil _____ 5.00
Zinc oxide _____ 10.00
Sulphur _____ 2.25
D. P. G. _____ 0.40
                                              ─────
                                              100

Two stocks were mixed, one according to the recipe and the other the same except for the addition of 1.5% of anti-oxidant.

After milling and curing, the two rubber stocks were tested for aging qualities by the usual oven and oxygen bomb methods.

The results are as follows:

| Days in oven at 70° C. | Stock—A— (Without anti-oxidant) | | Stock—B— (1.5% anti-oxidant) | |
|---|---|---|---|---|
| | Tensile | Elongation | Tensile | Elongation |
| Cure 50' by 40# | | | | |
| Original | 4085 | 700 | 4260 | 720 |
| 2 days | 3990 | 690 | 4420 | 720 |
| 6 days | 3420 | 580 | 4015 | 710 |
| 10 days | 2810 | 560 | 3645 | 640 |
| 15 days | 2080 | 540 | 3230 | 610 |
| 20 days | 1660 | 430 | 2580 | 560 |
| Oxygen bomb 48 hrs. by 70° C. by 300 lbs | 430 | 500 | 1605 | 630 |
| Cure 70' by 40# | | | | |
| Original | 4035 | 730 | 4320 | 700 |
| 2 days | 3885 | 700 | 4290 | 700 |
| 6 days | 3140 | 620 | 3890 | 670 |
| 10 days | 2525 | 540 | 3390 | 590 |
| 15 days | 1840 | 480 | 2965 | 520 |
| 20 days | 1385 | 300 | 2320 | 480 |
| Oxygen bomb 48 hrs. by 70° C. by 300 lbs | 410 | 410 | 1375 | 520 |

Example 2

In this example the use of BB' di (xylyl amino) ethyl ether is illustrated. The material was prepared by heating 1 mol BB' dichlor ethyl ether with 4 mols of xylidine, washing with water to remove xylidine hydro chloride. The morpholine derivatives were then removed and this purified material used as such.

The composition of the rubber stock is as follows:

Rubber _____ 55.35
Stearic acid _____ 2.00
Carbon black _____ 20.00
Oil _____ 5.00
Sulphur _____ 2.25
Zinc oxide _____ 15.00
Diphenyl guanidine _____ 0.40
                                              ─────
                                              100

Two stocks were mixed, one according to the recipe as given and the other containing 1.25% anti-oxidant.

The two compounds were milled and calendered into sheets $\frac{1}{16}$th inch in thickness. After vulcanization, the two rubber sheets were tested for aging qualities by the usual oven and oxygen bomb methods.

The results are as follows:

| Days in oven at 70° C. | Stock —A— Without anti-oxidant | | Stock —B— 1.25% anti-oxidant | |
|---|---|---|---|---|
| | Tensile | Elongation | Tensile | Elongation |
| Cure 50' by 40# | | | | |
| Original | 3820 | 700 | 3900 | 700 |
| 2 days | 3565 | 660 | 3920 | 670 |
| 7 days | 2740 | 640 | 3520 | 660 |
| 10 days | 2260 | 580 | 3235 | 650 |
| 14 days | 1930 | 540 | 3160 | 620 |
| 21 days | 1350 | 430 | 2560 | 590 |
| Oxygen bomb 48 hrs. by 70° C. by 300 lbs | 230 | 230 | 1445 | 560 |
| Cure 70' by 40# | | | | |
| Original | 3750 | 670 | 4225 | 660 |
| 2 days | 3540 | 600 | 3700 | 610 |
| 7 days | 2670 | 580 | 3500 | 610 |
| 10 days | 1990 | 530 | 3250 | 610 |
| 14 days | 1665 | 470 | 3105 | 590 |
| 21 days | 905 | 340 | 2500 | 540 |
| Oxygen bomb 48 hrs. by 70° C. by 300 lbs | 275 | 240 | 1455 | 500 |
| Cure 90' by 40# | | | | |
| Original | 3580 | 630 | 3690 | 640 |
| 2 days | 3500 | 600 | 3660 | 600 |
| 7 days | 2640 | 540 | 3365 | 600 |
| 10 days | 1880 | 470 | 3130 | 580 |
| 14 days | 1510 | 400 | 2960 | 510 |
| 21 days | 1000 | 270 | 2530 | 510 |
| Oxygen bomb 48 hrs. by 70° C. by 300 lbs | 300 | 220 | 1160 | 400 |

Example 3

In order to demonstrate the use of BB' di (alpha naphthyl amino) ethyl ether, the following example is given. The material was prepared by heating 1 mol of BB' dichlor ethyl ether with 4 mols alpha naphthyl amine, separating the alpha naphthyl amine hydrochloride and removing the morpholine derivatives. The material was then ready for use.

The composition of the rubber stock is as follows:

| | |
|---|---|
| Rubber | 55.35 |
| Stearic acid | 2.00 |
| Carbon black | 20.00 |
| Oil | 5.00 |
| Zinc oxide | 15.00 |
| Sulphur | 2.25 |
| Diphenyl guanidine | 0.40 |
| | 100 |

Two rubber compounds, one with and one without anti-oxidant were mixed and cured and subjected to the usual artificial age tests, namely, the oven and oxygen bomb methods.

The results on aging are given in the following table:

| Days in oven at 70° C. | Stock—A— Without anti-oxidant | | Stock—B— 1.25% anti-oxidant | |
|---|---|---|---|---|
| | Tensile | Elongation | Tensile | Elongation |
| Cure 50' by 40# | | | | |
| Original | 3820 | 700 | 3600 | 700 |
| 2 days | 3565 | 660 | 3800 | 640 |
| 7 days | 2740 | 640 | 3480 | 640 |
| 10 days | 2260 | 580 | 3120 | 610 |
| 14 days | 1930 | 540 | 3025 | 560 |
| 21 days | 1350 | 430 | 2545 | 540 |
| Oxygen bomb 48 hrs. by 70° C. by 300# | 230 | 230 | 1465 | 550 |
| Cure 70' by 40# | | | | |
| Original | 3750 | 670 | 3690 | 670 |
| 2 days | 3540 | 600 | 3980 | 600 |
| 7 days | 2670 | 580 | 3400 | 580 |
| 10 days | 1990 | 530 | 3200 | 550 |
| 14 days | 1665 | 470 | 3015 | 510 |
| 21 days | 905 | 340 | 2410 | 470 |
| Oxygen bomb 48 hrs. by 70° C. by 300# | 270 | 240 | 1390 | 480 |
| Cure 90' by 40# | | | | |
| Original | 3580 | 630 | 3980 | 640 |
| 2 days | 3500 | 600 | 3610 | 570 |
| 7 days | 2640 | 540 | 3395 | 550 |
| 10 days | 1880 | 470 | 2820 | 480 |
| 14 days | 1510 | 400 | 2640 | 420 |
| 21 days | 1000 | 270 | 2160 | 380 |
| Oxygen bomb 48 hrs. by 70° C. by 300# | 300 | 230 | 1240 | 400 |

Example 4

In this example the use of several BB' di (aryl amino) ethyl ethers is demonstrated. They are as follows:

(a) BB' di (ethyl phenyl amino) ethyl ether prepared by heating 1 mol of BB' dichlor ethyl ether with 4 mols of ethyl aniline, separating the ethyl aniline hydrochloride and removing the morpholine derivative. The material is then ready for use. The probable formula for the material is:

$$\begin{array}{c}C_6H_5\\C_2H_5\end{array}\!\!\!\!\!\bigg\rangle N-CH_2-CH_2-O-CH_2-CH_2-N\!\bigg\langle\!\!\!\!\!\begin{array}{c}C_6H_5\\C_2H_5\end{array}$$

(b) BB' di (para tolyl amino) ethyl ether prepared by heating 1 mol of BB' dichlor ethyl ether with 4 mols of para toluidine, and separating the para toluidine hydrochloride. The crude product is then ready for use.

(c) BB' di (ortho tolyl amino) ethyl ether prepared by heating 1 mol of BB' dichlor ethyl ether with 4 mols of ortho toluidine, separating the ortho toluidine hydrochloride and removing the morpholine derivative. The material is then ready for use. The probable formula is:

$$CH_3C_6H_4NH-CH_2-CH_2-O-\\CH_2-CH_2-NH-C_6H_4CH_3$$

(d) BB' (phenyl amino) (alpha naphthyl amino) ethyl ether prepared by heating 1 mol of BB' dichlor ethyl ether with 2 mols of aniline and 2 mols of alpha naphthyl amine, and separating the aniline and alpha naphthyl amine hydrochloride. The crude product is then ready for use.

To demonstrate the above materials as antioxidants they were mixed into a rubber compound containing the following ingredients:

| | |
|---|---:|
| Rubber | 55.35 |
| Stearic acid | 2.00 |
| Carbon black | 20.00 |
| Oil | 5.00 |
| Zinc oxide | 15.00 |
| Sulphur | 2.25 |
| Diphenyl guanidine | 0.40 |
| | 100 |

After vulcanization, the rubber stocks were subjected to artificial age tests. The results are given in the following table. In the following table, "Elong" means elongation at break in percent.

| Days in Oven at 70° C. | Without anti-oxidant | | 1.25%-A- | | 1.25%-B- | | 1.25%-C- | | 1.25%-D- | |
|---|---|---|---|---|---|---|---|---|---|---|
| | Tensile | Elong. | Tensile | Elong. | Tensile | Elong. | Tensile | Elong. | Tensile | Elong. |
| *Cure 50' by 40#* | | | | | | | | | | |
| Original | 3820 | 700 | 4370 | 700 | 3680 | 670 | 3735 | 710 | 3890 | 720 |
| 2 days | 3565 | 660 | 3570 | 640 | 3605 | 650 | 3880 | 680 | 4100 | 690 |
| 7 days | 2740 | 640 | 3105 | 650 | 3600 | 670 | 3540 | 690 | 3755 | 700 |
| 10 days | 2260 | 580 | 2560 | 620 | 3440 | 660 | 2995 | 670 | 3580 | 650 |
| 14 days | 1930 | 540 | 2520 | 580 | 3240 | 650 | 3120 | 640 | 3225 | 660 |
| 21 days | 1350 | 430 | 1950 | 490 | 2900 | 610 | 2465 | 590 | 2845 | 550 |
| Oxygen bomb 48 hrs. by 70° C. by 300 lbs | 230 | 230 | 710 | 420 | 2280 | 640 | 1440 | 570 | 2000 | 610 |
| *Cure 70' by 40#* | | | | | | | | | | |
| Original | 3750 | 670 | 3920 | 680 | 3580 | 620 | 4045 | 680 | 4020 | 670 |
| 2 days | 3540 | 600 | 3535 | 600 | 3600 | 590 | 4020 | 660 | 4010 | 650 |
| 7 days | 2670 | 580 | 3060 | 600 | 3440 | 600 | 3465 | 630 | 3700 | 650 |
| 10 days | 1990 | 530 | 2540 | 560 | 3315 | 590 | 3090 | 600 | 3495 | 610 |
| 14 days | 1665 | 470 | 2380 | 510 | 3120 | 570 | 3040 | 590 | 3185 | 590 |
| 21 days | 905 | 340 | 1690 | 400 | 2820 | 530 | 2580 | 540 | 2710 | 510 |
| Oxygen bomb 48 hrs. by 70° C. by 300 lbs | 270 | 240 | 825 | 400 | 2305 | 600 | 1395 | 500 | 1910 | 570 |
| *Cure 90' by 40#* | | | | | | | | | | |
| Original | 3580 | 630 | 4045 | 660 | 3580 | 600 | 4120 | 650 | 3930 | 630 |
| 2 days | 3500 | 600 | 3520 | 580 | 3800 | 580 | 3660 | 590 | 4015 | 630 |
| 7 days | 2640 | 540 | 2940 | 550 | 3340 | 580 | 3280 | 590 | 3530 | 570 |
| 10 days | 1880 | 470 | 2420 | 500 | 3155 | 520 | 3065 | 540 | 3220 | 550 |
| 14 days | 1510 | 400 | 2160 | 440 | 3065 | 530 | 2880 | 510 | 2830 | 500 |
| 21 days | 1000 | 270 | 1650 | 340 | 2710 | 480 | 2360 | 450 | 2420 | 420 |
| Oxygen bomb 48 hrs. by 70° C. by 300 lbs | 300 | 230 | 650 | 340 | 2020 | 520 | 1400 | 460 | 1885 | 500 |

What I claim is:—

1. A rubber composition including a BB' diamino diethyl ether wherein one of the hydrogen atoms of each amino group is replaced by an alkyl hydrocarbon residue.

2. A rubber composition including a BB' diamino diethyl ether wherein one of the hydrogen atoms of one amino group is replaced by an aryl hydrocarbon residue and one of the hydrogen atoms of the other amino group is replaced by an alkyl hydrocarbon residue.

3. A rubber composition including a BB' diamino diethyl ether wherein each nitrogen atom is attached to an alkyl and an aryl hydrocarbon residue.

4. A rubber composition including a dialkyl substituted BB' diamino diethyl ether.

5. A rubber composition including the product obtained by heating one mol of BB' dichlor diethyl ether with at least two mols of a secondary aromatic amine.

6. A rubber composition including the product, from which morpholine derivatives have been removed, obtained by heating one mol of BB' dichlor diethyl ether with at least two mols of a secondary aromatic amine.

HAROLD A. MORTON.